Patented Oct. 2, 1934

1,975,716

UNITED STATES PATENT OFFICE 1,975,716

MANUFACTURE OF LITHOPONE

Joseph Guillissen, Brussels, Belgium

No Drawing. Application June 27, 1931, Serial No. 547,453. In France February 13, 1931

3 Claims. (Cl. 134—78)

It is known that the presence of a large amount of zinc oxide is harmful to various properties of the lithopone, more particularly to its colour.

The oxide of zinc is formed more especially during the calcining operation. However, already during the precipitation phase, some oxide of zinc may be formed owing to an exaggerated percentage in hydrate of the barium sulphide lye.

The lithopone may be freed from the excess of zinc oxide by washing with an acid, namely sulphuric acid, which solubilizes the zinc oxide.

Such a treatment has however the drawback of lowering the percentage of zinc of the lithopone and the fastness to light.

It has now been ascertained that by treating the lithopone with phosphoric acid after the precipitation takes place, and before and/or after the calcining operation so as to neutralize any alkalinity of the lithopone and to remove the whole or part of the zinc oxide, not only is the lithopone freed from the drawbacks inherent to alkalinity and to an excess of zinc oxide, but also the fastness to light is considerably increased even in the presence of relatively large amounts of chlorine.

The said treatment with phosphoric acid enables one therefore to obtain a lithopone which is white, neutral, and fast to light.

*First example.*—A lithopone containing 1.40 per cent of zinc oxide and an amount of alkali corresponding to 0.20 per cent of MgO, but poor in chlorine, has been placed in suspension in water and has received an addition of an amount of a solution of 5 per cent of phosphoric acid, such that the alkalinity shall be neutralized and the percentage of zinc oxide shall be brought down to 0.2 per cent, that is until 1.2 per cent of the zinc oxide has been neutralized by the acid.

The results of the above treatment are the following:

(1°) The yellow tint of the lithopone has disappeared and has been replaced by a white tint.

(2°) The alkaline reaction to phenolphthalein of the product has disappeared.

(3°) The "feeding" (that is an excessive thickening of suspensions of lithopone in oils) which the original sample possessed, has now disappeared.

(4°) The fastness to light of the original sample has increased.

(5°) The percentage of zinc after the treatment is different by less than 0.1 per cent from that before the treatment.

*2nd example.*—An aqueous solution of the same lithopone has received an addition of an amount of zinc chloride such that the lithopone after drying still contains 3.25 grams of combined chlorine per kilogram.

The sample thus obtained was not fast to light. It is in fact well known that such an amount of chlorine is 4 to 5 times larger than that hitherto allowed for obtaining an alkaline lithopone, fast to light.

When treated with phosphoric acid before drying, so as to contain in the dry state the same amount of chlorine, the lithopone has become fast to light.

This example shows that the treatment with phosphoric acid enables one to obtain a lithopone which is fast to light, even in the presence of considerable amounts of chlorine.

*Third example.*—A lithopone, of identical comsition to that considered above, has been treated with an amount of sulphuric acid sufficient to neutralize the free alkalinity and a small portion of the zinc oxide. This lithopone, washed, then dried, has become non-resistant to light.

If, after it has been carefully washed with sulphuric acid, the lithopone is treated with an amount of phosphoric acid corresponding to the whole or to the major portion of the remaining oxide of zinc, it recovers the property of fastness to light which it had lost by the treatment with sulphuric acid.

It has been ascertained that, if the suspension of lithopone in water is more concentrated, for instance 500 grams to the liter, or 1000 grams to the liter, the amounts of phosphoric acid necessary for obtaining a lithopone fast to light may be reduced appreciably.

If a portion of the chlorine is eliminated by repeated washing with water before the treatment, the amount of phosphoric acid may be also reduced.

It has already been proposed to add alkaline or earthy-alkaline phosphates to the finished lithopone. It should however be pointed out that these additions always give an alkaline reaction to the product.

It has also been proposed to add alkaline or earthy-alkaline phosphates to the zinc solutions, before precipitating the lithopone. These additions have no effect as to the neutralization of the zinc oxide which may be formed during the calcining operation. The action of alkaline phosphates is equivalent to that of other substances of alkaline reaction, such as: silicates, carbonates, borates, etc.

It has further been proposed in a process for increasing the resistance of lithopone to sunlight to dissolve zinc compounds contained in the lithopone by means of inorganic or organic acids such as sulfuric, phosphoric, acetic acids, and to wash thoroughly the acid treated lithopone with water so that the content of water soluble salts falls below say 0.2%. When phosphoric acid is used for such a treatment, a large excess of the acid would be required for dissolving the zinc compounds.

It is understood that the present invention does not cover the use of such an excess of phosphoric acid, since the object of the present invention is precisely not to dissolve the zinc compounds and to wash them away, but to leave them in the lithopone so as to increase the fastness to light and at the same time reduce the "feeding" of the lithopone. The washing with water of the lithopone treated with phosphoric acid according to the present invention can be entirely dispensed with.

According to the present process, the lithopone is treated after it has been completely prepared and already calcined, and the treatment is carried out in such a manner that the final product shall be neutral to phenolphthalein.

It is of course understood that instead of adding phosphoric acid as such, it is possible to utilize solutions of acid salts of the phosphoric acid, such as the sodium monophosphate or other chemical products capable of forming phosphoric acid by their reaction upon water, for instance the metaphosphoric and pyrophosphoric acids and their acid salts.

Also, the invention covers all methods utilizing reagents which liberate free phosphoric acid in solution, in such a manner that this latter acid shall react upon the alkalinity and upon the oxide of zinc of the lithopone.

The amount of phosphoric acid to be added does not depend only on the amount of ZnO to be neutralized, but also on the total percentage of Zn of the lithopone, and on the concentration of the suspension of lithopone in water during the treatment.

It is obvious that the invention is not limited to the amounts of phosphoric acid mentioned in the examples, as the said amounts may vary according to each particular case and be easily determined by a person acquainted with the art.

I claim:

1. A process for simultaneously increasing the fastness to light of lithopone and reducing the "feeding," which consists in treating calcined lithopone with an amount of phosphoric acid insufficient to dissolve oxide of zinc contained in the lithopone but sufficient to combine with the major portion of the oxide of zinc in the form of insoluble zinc phosphate in order to obtain a lithopone neutral to phenolphthalein, the product thus obtained being thereupon filter-pressed and dried.

2. A process for simultaneously increasing the fastness to light of lithopone and reducing the "feeding", which consists in treating calcined lithopone with an amount of phosphoric acid insufficient to dissolve oxide of zinc contained in the lithopone but sufficient to combine with the major portion of the oxide of zinc in the form of insoluble zinc phosphate in order to obtain a lithopone neutral to phenolphthalein.

3. A process for the manufacture of lithopone fast to light, which consists in suspending in water lithopone poor in chloride and containing about 1.40% zinc oxide and alkali corresponding to about 0.2% MgO, then adding thereto a solution of phosphoric acid of about 5% strength, thereby neutralizing the alkalinity and reducing without removing the amount of zinc oxide to 0.2%.

JOSEPH GUILLISSEN.